US005536805A

United States Patent [19]
Kangas

[11] Patent Number: 5,536,805
[45] Date of Patent: Jul. 16, 1996

[54] MIXTURE OF ISOCYANATE-TERMINATED POLYURETHANE PREPOLYMERS HAVING GOOD ADHESION

[75] Inventor: Lani S. Kangas, Woodbury, Minn.

[73] Assignee: Minnesota Mining and Manufacturing Company, St. Paul, Minn.

[21] Appl. No.: 419,004

[22] Filed: Apr. 7, 1995

Related U.S. Application Data

[62] Division of Ser. No. 201,050, Feb. 24, 1994, Pat. No. 5,418,310, which is a continuation of Ser. No. 646,067, Jan. 25, 1991, abandoned, which is a continuation-in-part of Ser. No. 515,113, Apr. 27, 1990, abandoned.

[51] Int. Cl.$^6$ ............................. C08L 75/06; C08L 75/08
[52] U.S. Cl. ......................... 528/59; 525/440; 525/457; 525/458; 528/40; 528/67
[58] Field of Search .................................. 525/440, 457, 525/458; 528/40, 57, 67

[56] References Cited

U.S. PATENT DOCUMENTS

| | | | |
|---|---|---|---|
| 3,919,173 | 11/1975 | Coyer et al. | 260/77.5 |
| 3,931,077 | 1/1976 | Uchigaki et al. | 260/26 |
| 4,059,715 | 11/1977 | Pletcher | 428/349 |
| 4,092,202 | 5/1978 | Bergk et al. | 156/331 |
| 4,182,898 | 1/1980 | Fujiwara et al. | 560/26 |
| 4,352,858 | 10/1982 | Stanley | 428/423.1 |
| 4,357,441 | 11/1982 | Hamamura et al. | 524/391 |
| 4,546,167 | 10/1985 | Chang | 528/64 |
| 4,585,819 | 4/1986 | Reischle et al. | 524/196 |
| 4,588,802 | 5/1986 | Chang | 528/44 |
| 4,661,542 | 4/1987 | Gilch et al. | 524/59 |
| 4,786,703 | 11/1988 | Starner et al. | 528/63 |
| 4,820,368 | 4/1989 | Markevka et al. | 156/307.3 |
| 4,929,667 | 5/1990 | Ban et al. | 524/718 |
| 5,019,638 | 5/1991 | Muller et al. | 528/83 |
| 5,115,073 | 5/1992 | Meckel et al. | 528/83 |
| 5,137,984 | 8/1992 | Kangas et al. | 525/411 |
| 5,173,538 | 12/1992 | Gilch et al. | 525/130 |

FOREIGN PATENT DOCUMENTS

| | | |
|---|---|---|
| 55264/86 | 3/1985 | Australia. |
| 53378/86 | 8/1986 | Australia. |
| 2025815 | 3/1991 | Canada. |
| 0081103 | 6/1983 | European Pat. Off.. |
| 0081693 | 6/1983 | European Pat. Off.. |
| 0340906A1 | 11/1989 | European Pat. Off.. |
| 0344912A2 | 12/1989 | European Pat. Off.. |
| 0369517A1 | 5/1990 | European Pat. Off.. |
| 0369607A1 | 5/1990 | European Pat. Off.. |
| 62-181375 | 8/1987 | Japan. |
| 2021603 | 12/1979 | United Kingdom. |
| 2137638 | 10/1984 | United Kingdom. |

OTHER PUBLICATIONS

Huber et al., "Shaping Reactive Hot Melts Using LMW Copolyesters", *Adhesives Age*, pp. 32–35, Nov. 1987.

Huber et al., "Moisture Curing Hot Melts", *1988 Hot Melt Symposium*, pp. 89–95, Jun. 1988.

Huber et al., "Structural Bonding with Polyester Hot Melt Adhesives", *1990 Hot Melt Symposium*, pp. 109–113, Jun. 1990.

"Tire Sealants" *Chemical Abstracts*, Nov. 1987, vol. 87, No. 20, p. 50, #87:153227a.

"Insulation Coatings" *Chemical Abstracts*, Aug. 1986, vol. 105, No. 8, pp. 110–101, #105:62382W.

"Urethane Epoxy Resins" *Chemical Abstracts*, Jun. 1986, vol. 104, No. 24, p. 39, #104:208244f.

*Primary Examiner*—Thomas Hamilton, III
*Attorney, Agent, or Firm*—Gary L. Griswold; Walter N. Kirn; Steven E. Skolnick

[57] ABSTRACT

A blend of isocyanate-terminated polyurethane prepolymers comprising: (a) a first prepolymer which comprises the reaction product of an at least essentially semicrystalline hydroxy-functional material and a polyisocyanate; (b) a second prepolymer which comprises the reaction product of a poly(tetramethylene glycol) ether and a polyisocyanate; and (c) a third prepolymer which comprises the reaction product of an essentially amorphous hydroxy-functional material and a polyisocyanate. The blend may also include a fourth prepolymer which comprises the reaction product of a slightly branched hydroxy-functional material and a polyisocyanate.

20 Claims, No Drawings

MIXTURE OF ISOCYANATE-TERMINATED POLYURETHANE PREPOLYMERS HAVING GOOD ADHESION

CROSS-REFERENCE TO RELATED APPLICATIONS

This is a division of application Ser. No. 08/201,050, filed Feb. 24, 1994, now U.S. Pat. No. 5,418,310, which is a continuation of application Ser. No. 07/646,067, filed Jan. 25, 1991, now abandoned, which is a continuation-in-part of application Ser. No. 07/515,113, filed Apr. 27, 1990, now abandoned.

BACKGROUND OF THE INVENTION

1. Field of the Invention

This invention relates to mixtures of isocyanate-terminated polyurethanes having good adhesion to metal and polymeric substrates and to the use of such mixtures as hot melt adhesives, coatings and/or sealants.

2. Description of the Related Art

Isocyanate-terminated polyurethane prepolymers (sometimes referred to hereinafter as "polyurethane prepolymers" or "prepolymers") are desirable in a variety of applications. For example, they can be used in reactive hot melt urethane adhesive, coating and/or sealant systems. Hot melt urethane systems are solid at room temperature, melt to a viscous liquid when heated to moderate temperatures (e.g., 82°–121° C.), and are applied in a molten state to an appropriate substrate. They then cool to a solid state to provide an initial bond strength (sometimes referred to as "green strength"), and eventually achieve their ultimate bond strength in a curing reaction with ambient moisture.

An adhesive which can readily bond to a variety of metallic substrates is useful in numerous applications, especially where other techniques of metal attachment, for example, welding, brazing, soldering, mechanical fasteners (e.g., bolts, screws, rivets, clips and the like), adhesive tapes, or solvent-based chemical bonding agents are undesirable or not feasible. An adhesive which can readily bond to polymeric substrates, for example, polystyrene or polymethylmethacrylate are also useful because such substrates previously have not been amenable to adhesive bonding.

U.S. Pat. No. 3,931,077 to Uchigaki et al. discloses a reactive hot melt composition comprising: (a) 20–73 wt. % of a urethane prepolymer prepared from a diol selected from ethylene glycol, propylene glycol, 1,4-butanediol, 1,4-butinediol (sic), polymers thereof and poly(tetramethylene glycol) ether (sic); (b) 2–25 wt. % of a thermoplastic resin of an ethylene-vinyl acetate copolymer, an ethylene-acrylic acid copolymer, an ethylene-acrylate copolymer, an atactic polypropylene or a poly(ethylene terephthalate) linear polymer; and (c) 25–55 wt. % of a tackifier. It is stated that the tackifiers impart high cohesive force at temperatures below 60° C. and high instant adhesive strength. It is also stated that the compositions have a long pot-life, high instant adhesive strength, and good application temperature characteristics. A blend of prepolymers based on an essentially semicrystalline hydroxy-functional material, an essentially amorphous hydroxy-functional material, and poly(tetramethylene ether)glycol is not disclosed.

U.S. Pat. No. 4,352,858 to Stanley discloses a modified polyurethane adhesive composition comprising an isocyanate-terminated prepolymer and a dicarbamate ester which is compatible with the prepolymer and which contains two free isocyanate groups. It is stated that the dicarbamate coreacts with the prepolymers and becomes part of the cured polymer matrix, thereby contributing to the properties of the cured polymer. A blend of prepolymers based on essentially semicrystalline and essentially amorphous hydroxy-functional materials and poly(tetramethylene ether)glycol is not disclosed.

British Patent No. 2,137,638 discloses a urethane hot melt adhesive composition which comprises a moisture-curable polyurethane formed from a diisocyanate, a substantially linear hydroxy polyester, and a monofunctional reactant present in an amount sufficient to react with up to 40 mole percent of the isocyanate groups of the product of the prepolymer reaction. Supposedly this provides a coating composition which is susceptible to moisture but which does not degrade during storage of a coated substrate. That is, the coating is no longer heat softenable. A blend of polyurethane prepolymers based on an essentially semicrystalline hydroxy-functional material, an essentially amorphous hydroxy-functional material, and poly(tetramethylene ether)glycol is not disclosed.

U.S. Pat. No. 4,585,819 to Reischle et al. discloses a polyurethane hot melt composition which comprises an isocyanate prepolymer, a thermoplastic polyurethane or polyester, and/or a low molecular weight synthetic resin selected from the group consisting of ketone resins, hydrogenation products of acetophenone condensation resins, and mixtures thereof. The resin is stated to improve hot tack, wetting capacity, and the binding velocity of the not crosslinked adhesive. A blend of polyurethane prepolymers based on essentially semicrystalline and essentially amorphous hydroxy-functional materials and poly(tetramethylene ether)glycol is not disclosed.

U.S. Pat. No. 4,820,368 to Markevka et al. discloses a reactive hot-melt urethane adhesive composition comprising a polyurethane prepolymer composition which is the reaction product of a polyalkylene polyol, an isocyanate compound, a thermoplastic block copolymer, and an aliphatic, aromatic or mixed aliphatic-aromatic tackifying resin. Bonds formed with the adhesive are said to have good heat stability, initial bond strength and pot stability. A blend of polyurethane prepolymers based on essentially semicrystalline and essentially amorphous hydroxy-functional materials and poly(tetramethylene ether)glycol is not disclosed.

European Patent Application Publication No. 0 340 906 discloses a hot melt polyurethane adhesive composition which comprises a mixture of at least two amorphous polyurethane prepolymers characterized in that each prepolymer provides a different glass transition point to the composition. It is stated that while the separate prepolymers do not give satisfactory properties, a mixture of the two prepolymers does. A blend of polyurethane prepolymers which is based at least in part on poly(tetramethylene ether)glycol is not disclosed.

Several articles by H. F. Huber and H. Müller ("Moisture Curing Hot Melts," 1988 Hot Melt Symposium, Tappi Notes, published by Tappi Press, Atlanta, Ga., "Structural Bonding with Polyester Hot Melt Adhesives," 1990 Hot Melt Symposium, Tappi Notes, published by Tappi Press, and "Shaping Reactive Hot Melts Using LMW Copolyesters," *Adhesives Age*, November, 1987) disclose the combination of isocyanate-capped amorphous and crystalline polyesters, which combinations are said to provide good adhesion to various specific substrates. Formulations which include an isocyanate-terminated poly(tetramethylene ether)glycol are not disclosed.

SUMMARY OF THE INVENTION

In copending Patent application Ser. No. 07/515,113 filed Apr. 27, 1990, now abandoned, the utility of an adhesive, coating and/or sealant formulation consisting essentially of a first isocyanate-terminated polyurethane based on the reaction product of a polyhexamethylene adipate and a polyisocyanate and a second isocyanate-terminated polyurethane based on the reaction product of poly(tetramethylene ether) glycol and a polyisocyanate is described. This formulation has excellent adhesion to a variety of polymeric substrates which previously have not been amenable to adhesive bonding. Such substrates include polystyrene, polycarbonate, polyvinyl chloride, acrylonitrile/butadiene/styrene terpolymers, polyesters, and polymethylmethacrylate.

It has now been discovered that the addition of a third isocyanate-terminated polyurethane prepolymer which comprises the reaction product of an essentially amorphous (i.e., glassy) polyester polyol and a polyisocyanate provides excellent adhesion to metal substrates such as cold rolled steel and abraded aluminum. It has also been discovered that polyhexamethylene adipate is but one example of a broader class of useful materials.

Thus, the present invention relates to a blend of isocyanate-terminated polyurethane prepolymers. The blend comprises first, second and third prepolymers.

The first prepolymer comprises the reaction product of an at least essentially semicrystalline hydroxy-functional material and a polyisocyanate. The at least essentially semicrystalline hydroxy-functional material preferably has an essentially linear, saturated, aliphatic structure, a crystalline melting point between about 5° C. and 120° C. (more preferably between about 40° C. and 105° C.), and a glass transition temperature less than about 0° C. The at least essentially semicrystalline hydroxy-functional material may comprise the reaction product of a diol having from about 2 to 10 methylene groups and a dicarboxylic acid having from about 2 to 10 methylene groups. Diols useful in forming the at least essentially semicrystalline hydroxy-functional material may comprise, for example, ethylene glycol, 1,4-butanediol, 1,5-pentanediol, 1,6-hexanediol, 1,8-octanediol, 1,10-decanediol, 1,4-cyclohexanediol, 1,4-cyclohexanedimethanol, and mixtures thereof. Dicarboxylic acids useful in forming the hydroxy-functional material of the first prepolymer may be selected from, for example, succinic acid, glutaric acid, adipic acid, sebacic acid, azelaic acid, 1,12-dodecanedioic acid, derivates thereof, and mixtures thereof.

The second prepolymer comprises the reaction product of a poly(tetramethylene ether) glycol and a polyisocyanate.

The third prepolymer comprises the reaction product of an essentially amorphous hydroxy-functional material and a polyisocyanate. Preferably, the essentially amorphous hydroxy-functional material contains aromatic functionality and has a glass transition temperature (preferably in the range of 0° C. to 50° C.) but does not exhibit a crystalline melting point. Preferably, the essentially amorphous hydroxy-functional material comprises the reaction product of a diol selected from the group consisting of ethylene glycol, propylene glycol, butanediol, hexanediol, cyclohexanedimethanol, neopentyl glycol, and mixtures thereof, and a dicarboxylic acid selected from the group consisting of succinic acid, adipic acid, sebacic acid, isophthalic acid, orthophthalic acid, terephthalic acid, derivatives thereof, and mixtures thereof.

The three component blend preferably comprises from about 10 to about 80 parts by weight of the first prepolymer, from about 10 to about 80 parts by weight of the second prepolymer, and from about 10 to about 80 parts by weight of the third prepolymer. More preferably, the three component blend comprises from about 30 to about 70 parts by weight of the first prepolymer, from about 10 to about 50 parts by weight of the second prepolymer, and from about 10 to about 55 parts by weight of the third prepolymer. Most preferably, the three component blend comprises from about 45 to about 60 parts by weight of the first prepolymer, from about 15 to about 20 parts by weight of the second prepolymer, and from about 15 to about 35 parts by weight of the third prepolymer.

According to the invention, the blend of prepolymers may further comprise a fourth isocyanate-terminated polyurethane prepolymer. A fourth prepolymer which comprises the reaction product of a slightly branched hydroxy-functional material and a polyisocyanate has been found to significantly increase the aggressive tackiness of the three component blend. The slightly branched material preferably has a hydroxyl functionality in the range of 2–3.5 and preferably comprises the reaction product of adipic acid, diethylene glycol and trimethylol propane. The fourth prepolymer preferably comprises up to about 25 parts by weight of the blend, more preferably up to about 15 parts by weight, and most preferably from about 1 to about 10 parts by weight.

DETAILED DESCRIPTION OF THE PREFERRED EMBODIMENTS

The present invention relates to a blend or mixture of isocyanate-terminated polyurethane prepolymers useful as an adhesive, coating and/or sealant and having good adhesion to metal and polymeric substrates.

In general, the blend comprises a first isocyanate-terminated polyurethane prepolymer (hereinafter referred to as "the first polyurethane prepolymer" or "the first prepolymer"), a second isocyanate-terminated polyurethane prepolymer (hereinafter referred to as "the second polyurethane prepolymer" or "the second prepolymer"), and a third isocyanate-terminated polyurethane prepolymer (hereinafter referred to as "the third polyurethane prepolymer" or "the third prepolymer"). Each prepolymer comprises the reaction product of a hydroxy-functional material, such as a polyester polyol, and a polyisocyanate.

The hydroxy-functional material of the first prepolymer useful in the invention is preferably an essentially linear, saturated aliphatic material which is at least essentially semicrystalline. By "essentially semicrystalline" it is meant that the first hydroxy-functional material exhibits both a crystalline melting point (Tm) and a glass transition temperature (Tg). Preferably, the hydroxy-functional material has a Tm between about 5° and 120° C. (more preferably between about 40° and 105° C.) and a Tg below about 0° C. Included within the scope of "at least essentially semicrystalline" materials are those which may be regarded as essentially crystalline. The polyester polyol used to prepare the first prepolymer typically has a number average molecular weight (Mn) of at least about 2000, preferably at least between about 2200 and about 10,000, and most preferably between about 2500 and about 7500. At a Mn below about 2000, the resultant prepolymer is soft and may lack cohesive strength in the uncured state. At a Mn above about 10,000, the resultant prepolymer tends to be viscous which increases the difficulty of depositing acceptably thin lines of adhesive on a substrate.

If the hydroxy-functional material of the first prepolymer is provided in the form of a polyester polyol, it may comprise the reaction product of a polyol, for example, a diol, and a polyacid, for example, a dicarboxylic acid.

Diols useful in preparing the hydroxy-functional material of the first prepolymer include, for example, those having from 2 to 10 methylene groups such as ethylene glycol, 1,4-butanediol, 1,5-pentanediol, 1,6-hexanediol, 1,8-octanediol, and 1,10-decanediol. Cycloaliphatic diols such as, for example, 1,4-cyclohexanediol and 1,4-cyclohexanedimethanol may also be employed.

Dicarboxylic acids useful in preparing the hydroxy-functional material of the first prepolymer include, for example, those having from about 2 to 10 methylene groups such as succinic acid, glutaric acid, adipic acid, sebacic acid, azelaic acid, and 1,12-dodecanedioic acid. Included within the scope of useful acids are acid derivatives such as acid anhydrides, acid halides, and alkyl esters such as, for example, the methyl and ethyl esters.

Suitable essentially semicrystalline polyester polyols useful in the invention include, for example, polyhexamethylene adipate, polybutylene adipate, poly-ε-caprolactone, and combinations thereof. Preferably, the essentially semicrystalline polyester polyol is polyhexamethylene adipate and most preferably, 1,6-polyhexamethylene adipate. 1,6-polyhexamethylene adipate is the reaction product of 1,6-hexanediol and adipic acid.

Examples of commercially available essentially semicrystalline polyester polyols useful in the invention include, for example, LEXOREZ 1130-30P from Inolex Chemical Co., RUCOFLEX 105-37 from Ruco Polymer Corporation, FORMREZ 66-20 from Witco Chemical Company, DYNACOLL 7360 from Hüls America, TONE 1271 from Union Carbide, and combinations or mixtures thereof.

The preferred hydroxy-functional material for the second prepolymer is a poly(tetramethylene ether) glycol, which is typically produced by the cationic polymerization of tetrahydrofuran (THF). The Mn of the poly(tetramethylene ether) glycol is preferably at least about 1000. Examples of commercially available poly(tetramethylene ether) glycols useful in the invention include, for example, POLYMEG 2000 from QO Chemical, Inc., the TERATHANE series from DuPont, and FOLYTHF from BASF Corporation, and combinations or mixtures thereof.

Hydroxy-functional materials used to prepare the third prepolymer are preferably essentially amorphous. ("Amorphous" is sometimes referred to herein as "glassy".) By "amorphous" or "glassy" it is meant that the hydroxy-functional material exhibits a Tg but lacks a Tm. Preferably the Tg is between about 0° C. and 50° C. and more preferably between about 0° C and 40° C. If the hydroxy-functional material of the third prepolymer is provided in the form of a polyester polyol it may comprise the reaction product of a polyol, for example a diol, and a polyacid, for example, a dicarboxylic acid. The glassy polyester polyol should have a Mn of at least about 1000, preferably between about 1200 and about 7500, and most preferably between about 1500 and about 6000. If the Mn is below 1000, the resultant prepolymer may lack sufficient cohesive strength. When the Mn is above about 7500, the resultant prepolymer is highly viscous and may be difficult to blend and apply at working temperatures.

Preferably, the essentially amorphous polyester polyol used to prepare the third prepolymer has at least some aromatic character (i.e., functionality). Polyols useful in preparing the polyester polyol include those of low molecular weight, for example, ethylene glycol, propylene glycol, butanediol, hexanediol, cyclohexanedimethanol and neopentyl glycol. Polyacids with which the polyols may be reacted include, for example, linear aliphatic dicarboxylic acids such as succinic, adipic, and sebacic acids, aromatic dicarboxylic acids such as isophthalic, orthophthalic, and terephthalic acids, and aliphatic/aromatic dicarboxylic acids. Included within the scope of useful acids are acid derivatives such as acid anhydrides and acid halides. Aromatic functionality may be introduced into the amorphous polyester polyol by reacting a diol with a blend of aliphatic and aromatic dicarboxylic acids.

Essentially amorphous polyester polyols useful in the invention include, for example, copolyesters formed during reactions between and/or among the following diols and diacids: neopentyl glycol, ethylene glycol, propylene glycol, 1,4-butanediol, 1,6-hexanediol, adipic acid, orthophthalic acid, isophthalic acid, and terephthalic acid. Preferably, the amorphous polyester polyol comprises the reaction product of ethylene glycol, neopentyl glycol, orthophthalic acid and adipic acid. Examples of commercially available amorphous polyester polyols useful in the invention include, for example, DYNACOLL 7110 and DYNACOLL 7111, each available from Hüls America, and combinations or mixtures thereof.

In some instances it may be desirable to add a fourth isocyanate-terminated polyurethane prepolymer to the blends of the invention for example, to improve tack, cohesive strength, and/or compatibility of the mixture. In particular, it has been observed that a fourth prepolymer derived from a slightly branched hydroxy-functional material (e.g., a polyester polyol), and a polyisocyanate may improve the aggressive tackiness of an adhesive formulation otherwise comprising the first, second and third prepolymers. By "slightly branched" it is meant that the hydroxy-functional material has a hydroxyl functionality greater than 2 but less than about 3.5. "Functionality" is defined as the number of reactive groups (i.e., hydroxyl groups) per molecule. The Mn of the slightly branched polyester polyol is at least about 1000. Slightly branched polyester polyols useful in the invention may be derived from the reactions of diethylene glycol, trimethylol propane and adipic acid. An example of a commercially available slightly branched polyester polyol useful in the invention is LEXOREZ 1931-50P, available from Inolex Chemical Co.

It has been noted hereinabove that the semicrystalline and amorphous polyester polyols may be defined in part with reference to whether they display a Tg and/or a Tm. The presence and/or absence of a glass transition temperature and a crystalline melting point are techniques often used to characterize semicrystalline and amorphous (glassy) polymers. The two thermal transitions, Tg and Tm, can be quantitatively determined by measuring changes in specific volume and heat capacity through accepted analytical procedures such as differential scanning calorimetry (DSC). More particularly, Tg and Tm were measured with a Perkin-Elmer 7 Series Thermal Analysis System programmed to scan at a rate of 20° C./min. The midpoint of the endothermic peak was considered to be the Tg. Tm was considered to be the temperature at the apex of the endothermic peak. These techniques are described more fully in *Thermal Characterization of Polymeric Materials,* edited by Edith A. Turi (published 1981 by Academic Press, New York, N.Y.).

Polyisocyanates which can be reacted with the hydroxy-functional materials to form the prepolymers used in the instant invention may be aliphatic or aromatic. Preferably, they are aromatic diisocyanates such as diphenylmethane-2,4'-diisocyanate and/or diphenylmethane 4,4'-diisocyanate (MDI); tolylene-2,4-diisocyanate and - 2,6-diisocyanate (TDI) and mixtures thereof. Other examples include: naphthylene-1,5-diisocyanate; triphenylmethane-4,4',4"-triisocyanate; phenylene-1,3-diisocyanate and -1,4-diisocyanate; dimethyl-3,3'-biphenylene-4,4'-diisocyanate; diphenylisopropylidine-4,4'-diisocyanate; biphenylene diisocyanate; xylylene-1,3-diisocyanate and xylylene-1,4-diisocyanate.

A list of useful commercially available polyisocyanates is found in the *Encyclopedia of Chemical Technology*, Kirk-Othmer, 2nd Ed., vol. 12, pp. 46–47, Interscience Pub., N.Y. (1967), which is incorporated herein by reference. Especially p referred isocyanates include diphenylmethane-4,4'-diiso cyanate and its isomers and mixtures thereof.

Isocyanate-functional derivative(s) of MDI and TDI may be used, such as liquid mixtures of the isocyanate-functional derivative with melting point modifiers (e.g., mixtures of MDI with polycarbodiimide adducts such as ISONATE 143L, commercially available from Dow Chemical Company). Small amounts of polymeric diphenylmethane diisocyanate, preferably 10% or less by weight of the total isocyanate components, (e.g., PAPI, and the series PAPI 20, commercially available from Dow Chemical Company, the MONDUR MR and MRS series of isocyanates commercially available from Mobay Chemical Corp., and RUBINATE M, commercially available from ICI Chemicals, Inc.) may be included. Blocked isocyanate compounds formed by reacting aromatic isocyanates or the above-described isocyanate-functional derivatives with blocking agents such as ketoximes and the like are also included within the invention. Such blocked isocyanate-functional derivatives will, for convenience, be regarded herein as isocyanate-functional derivatives of MDI and TDI.

The prepolymers useful herein may be prepared by techniques that are well known in the art. For example, prepolymers suitable in the invention may be formed by reacting a mixture of the hydroxy-functional polymers and the polyisocyanate(s) in a suitable vessel. Alternatively, the prepolymers may be prepared by reacting each of the hydroxy-functional polymers separately with the polyisocyanate(s) followed by blending of the resultant prepolymers. Still further, the prepolymers may be prepared by forming one prepolymer and subsequently forming the other prepolymer or prepolymers in the first.

Typically, the components are mixed at an elevated temperature using conventional mixing techniques. It is preferred to mix the components under anhydrous conditions. Generally, the prepolymers are prepared without the use of solvents although solvents may be employed if desired.

The isocyanate equivalents should be present in the reaction mixture in an amount greater than the hydroxyl equivalents. The equivalent ratio of isocyanate-to-hydroxyl (sometimes referred to hereinafter as the isocyanate index) is preferably from about 1.2/1 to about 10/1 and especially preferably from about 1.5/1 to 2.2/1.

The blends of the invention preferably comprise from about 10 to about 80 parts by weight of the first prepolymer, from about 10 to about 80 parts by weight of the second prepolymer, and from about 10 to about 80 parts by weight of the third prepolymer. More preferably, the three component blend comprises from about 30 to about 70 parts by weight of the first prepolymer, from about 10 to about 50 parts by weight of the second prepolymer, and from about 10 to about 55 parts by weight of the third prepolymer. Most preferably, the mixtures comprise from about 45 to about 60 parts by weight of the first prepolymer, from about 15 to about 20 parts by weight of the second prepolymer, and from about 15 to about 35 parts by weight of the third prepolymer.

If the fourth prepolymer is included in the mixture, it preferably comprises no more than up to about 25 parts by weight, more preferably no more than up to about 15 parts by weight, and most preferably from about 1 to about 10 parts by weight.

The compositions of the invention may further include isocyanate-terminated polyurethane prepolymers other than the prepolymers described above. The additional prepolymers may be added to the prepolymer blends of the invention for a variety of purposes such as to further adjust the open time, green strength build-up, tack, final strength, compatibility, adhesion etc. of the resultant mixture.

Similarly, other monomeric materials may also be included in the polymerization mixture so as to incorporate them directly into either the hydroxy-functional materials of the prepolymers or the prepolymers themselves. Examples of such other monomeric materials which may be used to modify the polyester polyols include neopentyl glycol, ethylene glycol, butanediol, hexanediol, succinic acid, sebacic acid, terephthalic acid, orthophthalic acid, etc. An example of a monomer which may be used to modify the poly(tetramethylene ether) glycol is ethylene oxide. The exact level of "other monomer" utilized is not critical to the invention provided it does not materially negatively affect the adhesion of the composition. Typically, the other monomers may comprise up to 50 mole percent of the polymerization mixture.

Other ingredients or adjuvants may be employed with the blends of the invention to impart to or modify particular characteristics of the composition. These ingredients are included in the overall blends or mixtures of the invention rather than being incorporated into the constituent components thereof. The adjuvants should be added only at a level that does not materially adversely interfere with the adhesion of the composition. The adjuvants may comprise up to 50 weight percent of the composition either individually or in combination. For example, chain-extension agents (e.g., short chain polyols such as ethylene glycol or butanediol); fillers (e.g., carbon black; glass, ceramic, metal or plastic bubbles; metal oxides such as zinc oxide; and minerals such as talc, clays, silica, silicates, and the like), thermoplastic resins; plasticizers; antioxidants; pigments; U.V. absorbers; and adhesion promoters such as silanes, and the like may be included to modify set time, open time, green strength build-up, tack, flexibility, adhesion etc.

In addition, the compositions of the invention may include an effective amount of a catalyst or reaction accelerator such as tertiary amines, metal-organic compounds, co-curatives, and the like. An effective amount of a catalyst is preferably from about 0.005 to 2 percent by weight of the total prepolymer weight. More preferably, the catalyst is present at a level of about 0.01 to about 0.5 percent, based on the total weight of the prepolymers employed.

The following examples are offered to aid understanding of the present invention and are not to be construed as limiting the scope thereof. All parts are by weight unless otherwise stated.

General Preparation of the Isocyanate-Terminated Polyurethane Prepolymers 4,4'-Diphenylmethane diisocyanate (MDI) was added to a 600 ml, stainless steel reactor fitted with a gas inlet adapter and a cover having a rubber gasket, a gas inlet, a stirrer opening, and a stirring rod. The MDI was heated to 100° C. and melted with efficient stirring under a nitrogen blanket.

After the MDI was melted, a blend of the hydroxy-functional materials was added. The blend included the semicrystalline and amorphous polyester polyols and poly(tetramethylene ether) glycol. (The blend may further include the slightly branched polyester polyol if such is to be incorporated into the ultimate mixture.) Stirring and heating under nitrogen were continued for about 15 minutes, and then 4,4'-(oxydi-2,1-ethanediyl) bis-morpholine (THANCAT DMDEE, an endcapping and cure promoting catalyst available from Texaco Chemical Co.) was added. Stirring was continued under vacuum for about 1 hour. Heating at 100° C. was maintained throughout. The resulting mixture was poured into nitrogen-purged metal containers which were then sealed. The containers were stored in a desiccator.

Alternatively, the hydroxy-functional materials may be added to the melted MDI sequentially. Preferably, 15 minutes of stirring and heating are provided between each addition with the heating and stirring being maintained during the additions. The hydroxy-functional materials may be added in any order. The preferred order of addition is the slightly branched polyester polyol (if such be included), poly(tetramethylene ether) glycol, the essentially glassy or amorphous polyester polyol, and the essentially semicrystalline polyester polyol. If the slightly branched polyester polyol is not included, the order of addition is the same starting with poly(tetramethylene ether) glycol.

EXAMPLES 1–8

A series of isocyanate-terminated polyurethane prepolymers was made as described above in the general preparation, the hydroxy-functional materials being added to the MDI as a blend. (The hydroxy-functional materials were not added as a blend in example 1 since this example comprises only the first prepolymer.) The isocyanate index of each example was 2. Each example also included 0.05 parts by weight of THANCAT DMDEE. Each composition was tested for adhesion to metal and polymeric substrates. Results are reported in Table 1 below. Component values are reported in parts by weight.

Peel adhesion was determined using a modified version of ASTM D-903 in which the flexible substrate was canvas and the rigid substrate was either abraded aluminum, cold rolled steel, polystyrene or polymethylmethacrylate. The adhesive was extruded at 107° C. onto the center portions of 2.5 cm wide by 10 cm long by 0.15 cm thick pieces of methyl ethyl ketone-wiped abraded 6061-T6 grade aluminum (available from Vincent Metals, Minneapolis, Minn. 55440), the center portions of 2.5 cm wide by 10 cm long by 0.079 cm thick (20 gauge) pieces of methyl ethyl ketone-wiped cold rolled steel (available from Vincent Metals, Minneapolis, Minn. 55440), and the center portions of 2.5 cm wide by 10 cm long by 0.3 cm thick pieces of isopropanol-wiped rigid polystyrene (Huntsman grade 730) and isopropanol-wiped polymethylmethacrylate (available from National Tool & Manufacturing Co., Kenilworth, N.J.). Immediately, 3.8 cm wide by 28.5 cm long pieces of canvas were bonded to the aluminum, cold rolled steel, polystyrene and polymethylmethacrylate using a press at 0.7 MPa for about 15 to 20 seconds. This was sufficient pressure to force the adhesive to cover the entire bond area and squeeze excess adhesive from the edges of the bond area. The samples were conditioned at 25° C. and 50% relative humidity for 7 days. The canvas was then trimmed to a 2.5 cm width and the resulting coupons were tested using an Instron tensile tester at a crosshead speed of 5 cm per minute. Peel adhesion was measured as the average of the high and low readings of the three coupons and is reported in pounds per inch width (piw).

TABLE 1

| Example No. | 1 | 2 | 3 | 4 | 5 | 6 | 7 | 8 |
|---|---|---|---|---|---|---|---|---|
| 1st Prepolymer[1] | 100 | 60 | 45 | 60 | 60 | 60 | 60 | 45 |
| 2nd Prepolymer[2] | 0 | 40 | 55 | 0 | 0 | 20 | 20 | 20 |
| 3rd Prepolymer | | | | | | | | |
| (a)[3] | 0 | 0 | 0 | 40 | 0 | 20 | 0 | 0 |
| (b)[4] | 0 | 0 | 0 | 0 | 40 | 0 | 20 | 35 |
| Peel Adhesion (piw) | | | | | | | | |
| Abraded aluminum | 3 | 20 | 28 | 35 | 32 | 56 | NT | 52 |
| Cold rolled steel | 7 | 24 | 15 | 44 | 17 | 54 | 50 | 46 |
| Polystyrene | <1 | 45 | 37 | 28 | 3 | 55 | 41 | 49 |
| Polymethylmethacrylate | 36 | 40 | 56 | 6 | 4 | 59 | 45 | 60 |

NT = Not tested
[1] Prepared from 1,6-polyhexamethylene adipate, an essentially semicrystalline polyester polyol (LEXOREZ 1130-30P from Inolex Chemical Co., hydroxyl number of 30, Mn of 3740).
[2] Prepared from a poly(tetramethylene ether) glycol (POLYMEG 2000 from QO Chemical, Inc., hydroxyl number of 56, Mn of 2004).
[3] Prepared from an essentially amorphous polyester polyol (DYNACOLL 7110 from Hüls America, hydroxyl number of 55, acid number of 10, Mn of 1726).
[4] Prepared from an essentially amorphous polyester polyol (DYNACOLL 7111 from Hüls America, hydroxyl number of 32, Mn of 3507).

Table 1 shows that a blend of isocyanate-terminated polyurethane prepolymers based on 1,6-polyhexamethylene adipate, poly(tetramethylene ether) glycol, and an essentially amorphous polyester polyol (examples 6–8) has excellent adhesion to cold rolled steel and abraded aluminum relative to compositions comprising only two of the three prepolymers (examples 2–5). Table 1 further shows that the three component blends (examples 6–8) have adhesion to polystyrene and polymethylmethacrylate comparable to examples 2–3, which examples correspond to copending Patent application Ser. No. 07/515,113 now abandoned. However, examples 6–8 show a significant and surprising increase in plastic adhesion relative to examples 4–5, which examples include a blend of semicrystalline and amorphous prepolymers.

EXAMPLES 9–10

Examples 9 and 10 were prepared as described above in the general preparation and using the materials shown in examples 1–8 except that example 10 further included 10 parts by weight of a polyurethane prepolymer based on a slightly branched polyester polyol. Each example also included 0.05 parts of the catalyst of examples 1–8 and had an isocyanate index of 1.8. Component amounts are reported in parts by weight. Test results are reported in Table 2 below.

Examples 9 and 10 were also evaluated for aggressive tackiness according to a modified version of ASTM D-3121-73, a rolling ball tack test. More specifically, the standard test method was adapted for use with long open time hot melt adhesives. (By "long open time" it is meant that the adhesive remains tacky and bondable for an extended period of time after having been applied to a substrate.) A 30.5 cm long by 20.3 cm wide by 0.08 cm thick aluminum panel was provided with 10 cut out portions each measuring 15.2 cm long by 0.95 cm wide and spaced 1.91 cm apart so as to provide 10 troughs through which a ball could be released. The panel was inclined at an angle of 20.4° using a 10.2 cm high spacer. A first glass panel (30.5 cm by 30.5 cm by 0.64 cm thick) was secured below the slotted aluminum panel to provide a rolling surface for the ball. A second glass panel having dimensions similar to the first glass panel was positioned at the base of the inclined assembly.

A 25.4 cm long by 7.6 cm wide by 0.013 cm thick adhesive film was applied to the second glass panel in a rapid continuous motion using a Wehrman KTA 215 hot melt applicator operating at 107° C. and which had been fitted with a slotted nozzle having a 7.6 cm long by 0.05 cm wide coating slot. The dimensions of the adhesive film were controlled by depositing the adhesive between a pair of 2.54 cm wide by 5 mil (0.013 cm) thick masking tape strips that had been applied to the glass panel in parallel fashion and spaced apart 7.6 cm.

Twenty seconds after the adhesive was applied to the second glass panel, a steel ball (16.3 grams, 1.6 cm diameter) was released from the top of one of the slots cut in the inclined aluminum panel and was allowed to roll until it came to a stop on the adhesive film. The distance from the point where the ball initially contacted the adhesive to where the ball stopped was measured. Shorter distances indicated more aggressive tack. The values reported below in Table 2 are an average of four measurements. The test was conducted at ambient temperature (23.9° C.) and 50% relative humidity.

TABLE 2

| Example No. | 9 | 10 |
| --- | --- | --- |
| 1st Prepolymer | 60 | 60 |
| 2nd Prepolymer | 20 | 15 |
| 3rd Prepolymer[1] | 20 | 15 |
| 4th Prepolymer[2] | 0 | 10 |
| Peel Adhesion (piw) | | |
| Abraded aluminum | NT | 43 |
| Cold rolled steel | NT | 50 |
| Polystyrene | NT | 45 |
| Polymethylmethacrylate | NT | 52 |
| Rolling ball tack (cm) | 6.6 | 5.0 |

NT = Not tested
[1]Prepared from an essentially amorphous polyester polyol (DYNACOLL 7111 from Hüls America, hydroxyl number of 32, Mn of 3507).
[2]Prepared from a slightly branched polyester polyol (LEXOREZ 1931-50P from Inolex Chemical Co., hydroxyl number of 50, Mn of 2244).

Table 2 shows that the addition of 10 parts by weight of a prepolymer based on a slightly branched polyester polyol significantly increases the tack of the prepolymer blend. The formulation of example 10 demonstrated a 32% increase in rolling ball tack as compared to the formulation of example 9 even though the formulations were similar in open time, set time, and viscosity. Aggressive tack in curing hot melt adhesives causes a parallel improvement in the creep resistance of an adhesive before complete curing. Improved creep resistance is a desirable feature in certain applications, for example when bonding substrates which have an inherent memory or where the bond is subjected to a constant stress, such as may occur in edge banding (bonding of a substrate around a corner or bend).

Table 2 also shows that the formulation of example 10 has peel adhesion values comparable to those shown in Table 1. Thus, neither adding a fourth prepolymer or changing the isocyanate index from 2.0 to 1.8 materially adversely affected adhesion.

Reasonable variations or modifications are possible within the scope of the foregoing specification without departing from the invention which is defined in the accompanying claims.

The embodiments for which an exclusive property or privilege is claimed are defined as follows:

1. A moisture curable, hot melt adhesive coating and/or sealant composition comprising:
   (a) a first isocyanate-terminated prepolymer comprising the reaction product of an at least essentially semicrystalline hydroxy-functional material and a polyisocyanate;
   (b) a second isocyanate-terminated prepolymer comprising the reaction product of a poly(tetramethylene ether) glycol and a polyisocyanate;
   (c) a third isocyanate-terminated prepolymer comprising the reaction product of an essentially amorphous hydroxy-functional material and a polyisocyanate; and
   (d) a fourth isocyanate-terminated prepolymer comprising the reaction product of a slightly branched hydroxy-functional material and a polyisocyanate;
wherein the moisture curable, hot melt adhesive, coating and/or sealant composition is a solid at room temperature.

2. A moisture curable, hot melt adhesive, coating and/or sealant composition according to claim 1 wherein said at least essentially semicrystalline hydroxy-functional material has a crystalline melting point between about 5° C. and 120° C. and a glass transition temperature less than about 0° C.

3. A moisture curable, hot melt adhesive, coating and/or sealant composition according to claim 1 wherein said at least essentially semicrystalline hydroxy-functional material has a crystalline melting point between about 40° C. and 105° C.

4. A moisture curable, hot melt adhesive, coating and/or sealant composition according to claim 1 wherein said at least essentially semicrystalline hydroxy-functional material comprises the reaction product of a diol having from about 2 to 10 methylene groups and a dicarboxylic acid having from about 2 to 10 methylene groups.

5. A moisture curable, hot melt adhesive, coating and/or sealant composition according to claim 1 wherein said at least essentially semicrystalline hydroxy-functional material comprises the reaction product of:
   (a) a diol selected from the group consisting of ethylene glycol, 1,4-butanediol, 1,5-pentanediol, 1,6-hexanediol, 1,8-octanediol, 1,10-decanediol, 1,4-cyclohexanediol, 1,4-cyclohexanedimethanol, and mixtures thereof; and
   (b) a dicarboxylic acid selected from the group consisting of succinic acid, glutaric acid, adipic adic, sebacic acid, azelaic acid, 1,12-dodecanedioic acid, derivatives thereof, and mixtures thereof.

6. A moisture curable, hot melt adhesive, coating and/or sealant composition according to claim 1 wherein said second prepolymer has an isocyanate index of about 1.2:1 to 10:1 and the poly(tetramethylene ether)glycol has a molecular weight of at least about 1000.

7. A moisture curable, hot melt adhesive, coating and/or sealant composition according to claim 1 wherein said second prepolymer has a glass transition temperature of about −50° C. or less.

8. A moisture curable, hot melt adhesive, coating and/or sealant composition according to claim 1 wherein said essentially amorphous hydroxy-functional material has a glass transition temperature between about 0° C. and 40° C.

9. A moisture curable, hot melt adhesive, coating and/or sealant composition according to claim 1 wherein said essentially amorphous hydroxy-functional material comprises the reaction product of:
  (a) a dicarboxylic acid selected from the group consisting of succinic acid, adipic acid, sebacic acid, isophthalic acid, orthophthalic acid, terephthalic acid, derivatives thereof, and mixtures thereof; and
  (b) a diol selected from the group consisting of ethylene glycol, propylene glycol, butanediol, hexanediol, cyclohexanedimethanol, neopentyl glycol, and mixtures thereof.

10. A moisture curable, hot melt adhesive, coating and/or sealant composition according to claim 1 wherein said slightly branched hydroxy-functional material has a hydroxyl functionality greater than 2 and less than or equal to 3.5.

11. A moisture curable, hot melt adhesive, coating and/or sealant composition according to claim 10 wherein said slightly branched hydroxy-functional material comprises the reaction product of adipic acid, diethylene glycol and trimethylol propane.

12. A moisture curable, hot melt adhesive, coating and/or sealant composition according to claim 1 comprising from about 10 to about 80 parts by weight of said first prepolymer, from about 10 to about 80 parts by weight of said second prepolymer, from about 10 to about 80 parts by weight of said third prepolymer, and up to about 25 parts by weight of said fourth prepolymer.

13. A moisture curable, hot melt adhesive, coating and/or sealant composition according to claim 12 comprising from about 30 to about 70 parts by weight of said first prepolymer, from about 10 to about 50 parts by weight of said second prepolymer, from about 10 to about 55 parts by weight of said third prepolymer, and no more than about 15 parts by weight of said fourth prepolymer.

14. A moisture curable, hot melt adhesive, coating and/or sealant composition according to claim 13 comprising from about 45 to about 60 parts by weight of said first prepolymer, from about 15 to about 20 parts by weight of said second prepolymer, from about 15 to about 35 parts by weight of said third prepolymer, and from about 1 to about 10 parts by weight of said fourth prepolymer.

15. A moisture curable, hot melt adhesive, coating and/or sealant composition according to claim 1 wherein said at least essentially semicrystalline hydroxy-functional material is polyhexamethylene adipate.

16. A moisture curable, hot melt adhesive, coating and/or sealant composition according to claim 15 wherein said essentially amorphous hydroxy-functional material comprises the reaction product of ethylene glycol, neopentyl glycol, orthophthalic acid and adipic acid.

17. A moisture curable, hot melt adhesive, coating and/or sealant composition according to claim 16 wherein said slightly branched hydroxy-functional material comprises the reaction product of adipic acid, diethylene glycol and trimethylol propane.

18. A moisture curable, hot melt adhesive, coating and/or sealant composition according to claim 17 comprising from about 45 to about 60 parts by weight of said first prepolymer, from about 15 to about 20 parts by weight of said second prepolymer, from about 15 to about 35 parts by weight of said third prepolymer, and from about 1 to about 10 parts by weight of said fourth prepolymer.

19. An article, said article comprising a substrate having a layer of a moisture curable, hot melt adhesive, coating and/or sealant composition according to claim 1 thereon.

20. A moisture cured hot melt adhesive, coating and/or sealant composition comprising:
  (a) a first moisture cured material which material comprised the isocyanate-terminated reaction product of an at least essentially semicrystalline hydroxy-functional material and a polyisocyanate;
  (b) a second moisture cured material which material comprised the isocyanate-terminated reaction product of a poly(tetramethylene ether) glycol and a polyisocyanate;
  (c) a third moisture cured material which material comprised the isocyanate-terminated reaction product of an essentially amorphous hydroxy-functional material and a polyisocyanate; and
  (d) a fourth moisture cured material which material comprised the isocyanate-terminated reaction product of a slightly branched hydroxy-functional material and a polyisocyanate.

* * * * *